(12) United States Patent
Blaszczak et al.

(10) Patent No.: US 9,612,671 B1
(45) Date of Patent: Apr. 4, 2017

(54) STYLUS TIP

(71) Applicant: Amazon Technologies, Inc., Seattle, WA (US)

(72) Inventors: Piotr Pawel Blaszczak, Sunnyvale, CA (US); Timothy Michael Vanderet, San Francisco, CA (US); Ann Yuhui Yun, Mountain View, CA (US); Kam Sheng Leang, Pacifica, CA (US); Kishore Sundara-Rajan, San Jose, CA (US); Miguel Angel Morales, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 50 days.

(21) Appl. No.: 14/523,335

(22) Filed: Oct. 24, 2014

(51) Int. Cl.
  *G06F 3/041* (2006.01)
  *G06F 3/039* (2013.01)
  *G06F 3/0354* (2013.01)

(52) U.S. Cl.
  CPC .......... *G06F 3/039* (2013.01); *G06F 3/03545* (2013.01)

(58) Field of Classification Search
  CPC .... G06F 3/03545; G06F 3/0412; G06F 3/044; B82Y 30/00; Y10T 29/49117
  See application file for complete search history.

(56) References Cited

U.S. PATENT DOCUMENTS

| 9,195,351 B1 * | 11/2015 | Rosenberg | G06F 1/1626 |
| 9,239,639 B1 * | 1/2016 | Vanderet | G06F 3/03545 |
| 9,250,722 B2 * | 2/2016 | Leydon | G06F 3/03545 |
| 2005/0279231 A1 * | 12/2005 | Lee | B44B 5/0085 101/3.1 |
| 2009/0289922 A1 * | 11/2009 | Henry | G06F 3/03545 345/179 |
| 2014/0225875 A1 * | 8/2014 | Ding | G06F 3/0433 345/179 |
| 2015/0070304 A1 * | 3/2015 | Lettow | G06F 3/044 345/174 |
| 2016/0018912 A1 * | 1/2016 | Kaneda | G06F 3/033 345/179 |

FOREIGN PATENT DOCUMENTS

JP  2013129840  * 6/2014

OTHER PUBLICATIONS

JP2013129840 (using 2016/0018912 A1 as a translation of JP2013129840), Jun. 2014, Kaneda; Takenori.*

* cited by examiner

*Primary Examiner* — Nelson Rosario
(74) *Attorney, Agent, or Firm* — Seyfarth Shaw LLP; Ilan N. Barzilay; Christopher A. Baxter

(57) ABSTRACT

A removable stylus tip for use with an active stylus. The tip is capable of exchanging electrical communications with the touchscreen of a computing device. The tip includes a conductive core to transmit signals between the stylus body and a cone-shaped end of the stylus core. The cone-shaped end is covered with a coating to protect the tip and the touchscreen device. The coating is a composite material configured to allow electrical signals to pass through the material as well as to provide mechanical protection to components of the tip and touchscreen.

20 Claims, 8 Drawing Sheets

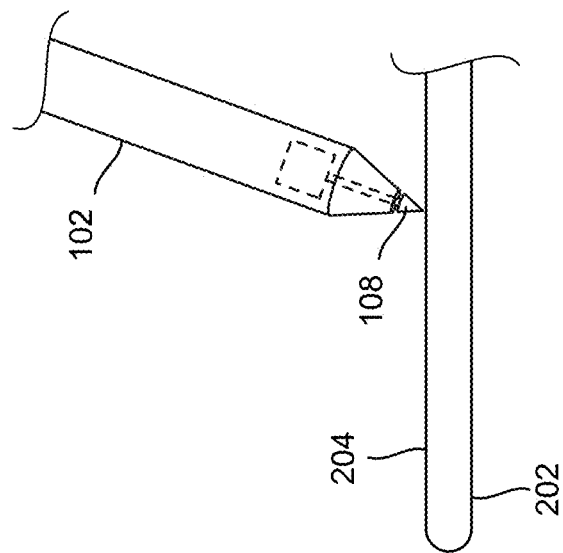
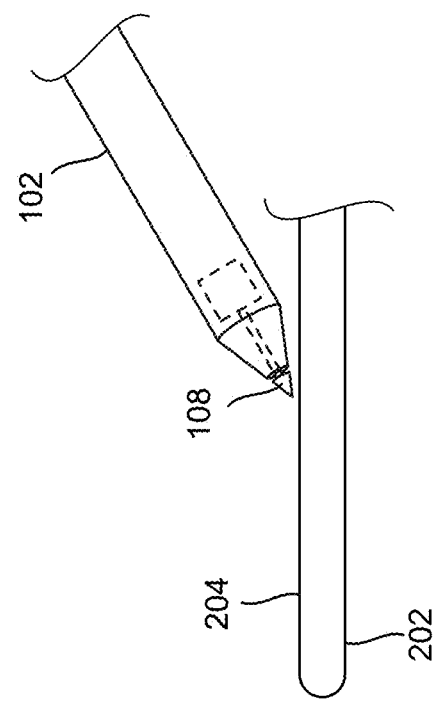
FIG. 4A
FIG. 4B

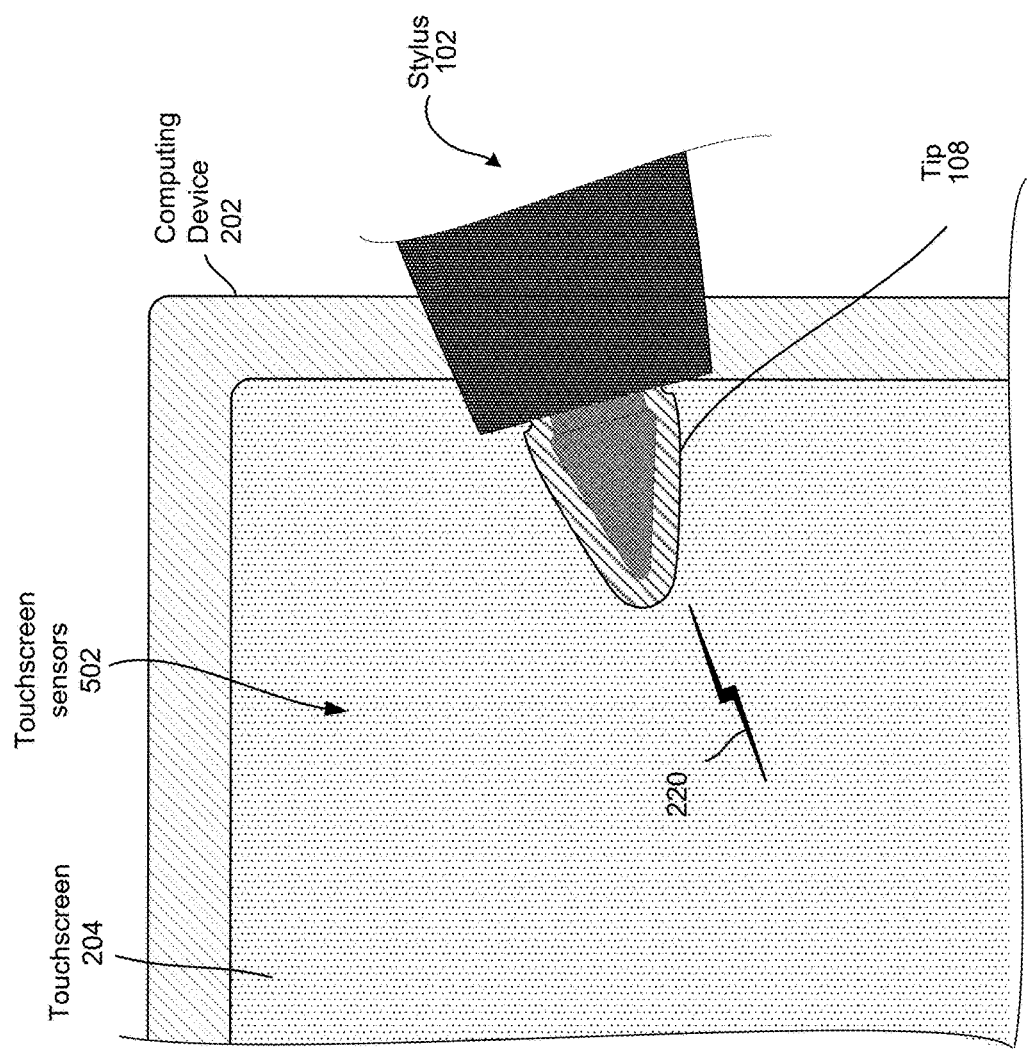

STYLUS TIP

BACKGROUND

With the advancement of technology, the use and popularity of electronic devices, such as mobile devices, has increased considerably. Mobile devices, such as smart phones and tablet computers, typically have touchscreens that enable a user to operate the devices by touching the screen with a finger or stylus type device.

BRIEF DESCRIPTION OF DRAWINGS

For a more complete understanding of the present disclosure, reference is now made to the following description taken in conjunction with the accompanying drawings.

FIGS. 4A and 4B illustrate different stylus interactions with a computing device according to embodiments of the present disclosure.

FIG. 5 illustrates a stylus interacting with a computing device according to embodiments of the present disclosure.

DETAILED DESCRIPTION

A stylus is typically used to write, draw and otherwise interact with a touchscreen or other surface of a computing device to provide input to applications and programs running on the computing device. To improve stylus-to-computing device interactions, a stylus may be configured as an active stylus that can communicate with the computing device, for example using components in the stylus tip and components of a touchscreen of the computing device. Such communications may take place using a capacitive link between the components in the stylus tip and components in the device touchscreen.

Designing a tip for a stylus presents a number of mechanical design challenges. First, normal operation of the stylus with the computing device should not cause damage to either the stylus or the computing device. Accordingly, the portion of the stylus tip designed to physically contact the touchscreen of the computing device should be covered with a material that enables smooth interactions between the stylus and the touchscreen without causing damage to either, such as deformation of internal stylus components, scratching of the screen or any of its coatings, etc. Second, the stylus should be designed to be sufficiently durable, that is the stylus is designed with longevity in mind so that regular and repeated use of the stylus will not cause it to degrade too quickly. Third, the stylus should be designed so that operation of the stylus provides a good tactile user experience. That is, the stylus tip should provide a certain amount of friction when dragged across the surface of the touchscreen. That friction should be small enough that the stylus tip travels smoothly across the touchscreen but not so small that it travels too smoothly across the touchscreen and is difficult to control. Ideally, interactions between the stylus tip and touchscreen should mimic those of writing on paper.

While the above concerns are important, they generally are present for most stylus designs. For an active stylus however, particularly one capable of electrical communications with a computing device using components in the stylus tip, the stylus must also be designed in a way that allows for effective electrical communication between the stylus tip and the touchscreen of the device. The effectiveness of the electrical communication depends not only on the design and configuration of the electrical components of the stylus tip, but also on the design and configuration of other components such as the coating on the stylus tip. Effective electrical communication between the stylus and touchscreen may be characterized by such factors as a having high signal strength and low signal-to-noise ratio, etc. without having too high of a power drain. Meeting the electrical concerns, as well as each of the above mechanical concerns presents a significant design challenge.

Figure 1:
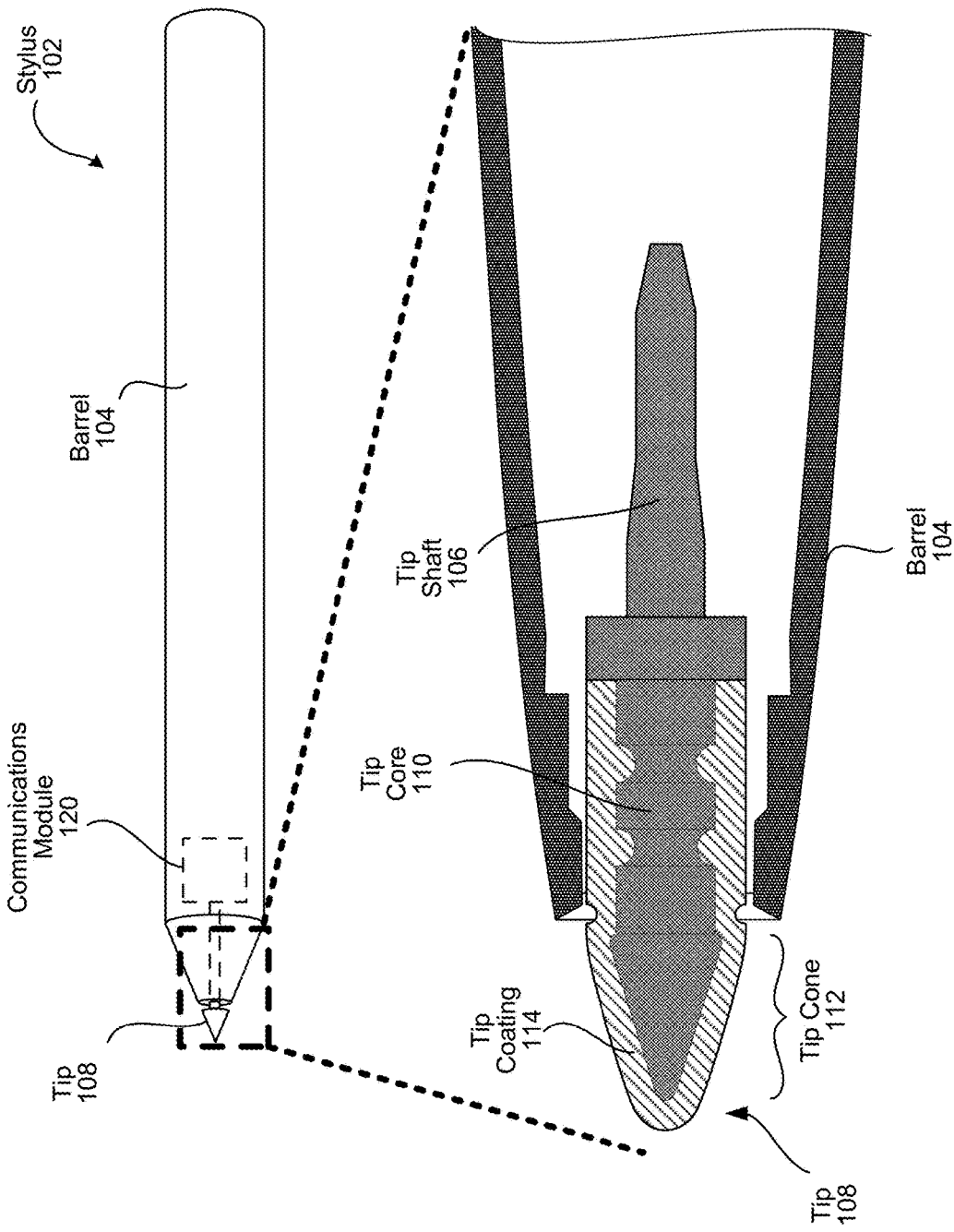
FIG. 1 illustrates a stylus tip construction according to embodiments of the present disclosure.

Offered is a stylus tip design that addresses each of the concerns above, as well as other design concerns. One example stylus tip design is illustrated in FIG. 1. As shown in FIG. 1, a stylus 102 comprises a barrel 104 and a tip 108. The stylus may also include other components such as a communications module 120 which may include components such as a processor, memory, etc. to enable communications between the stylus 102 and a touchscreen of a computing device. The communications module 120, and components thereof, may be electrically connected to the tip, for example through the tip shaft and tip core. The communications module 120 is discussed further below. A variety of other mechanical and/or electrical components may also be included in the stylus 102, however those components are not shown for purpose of clarity in explaining the design and configuration of the stylus tip 108.

Figure 2:
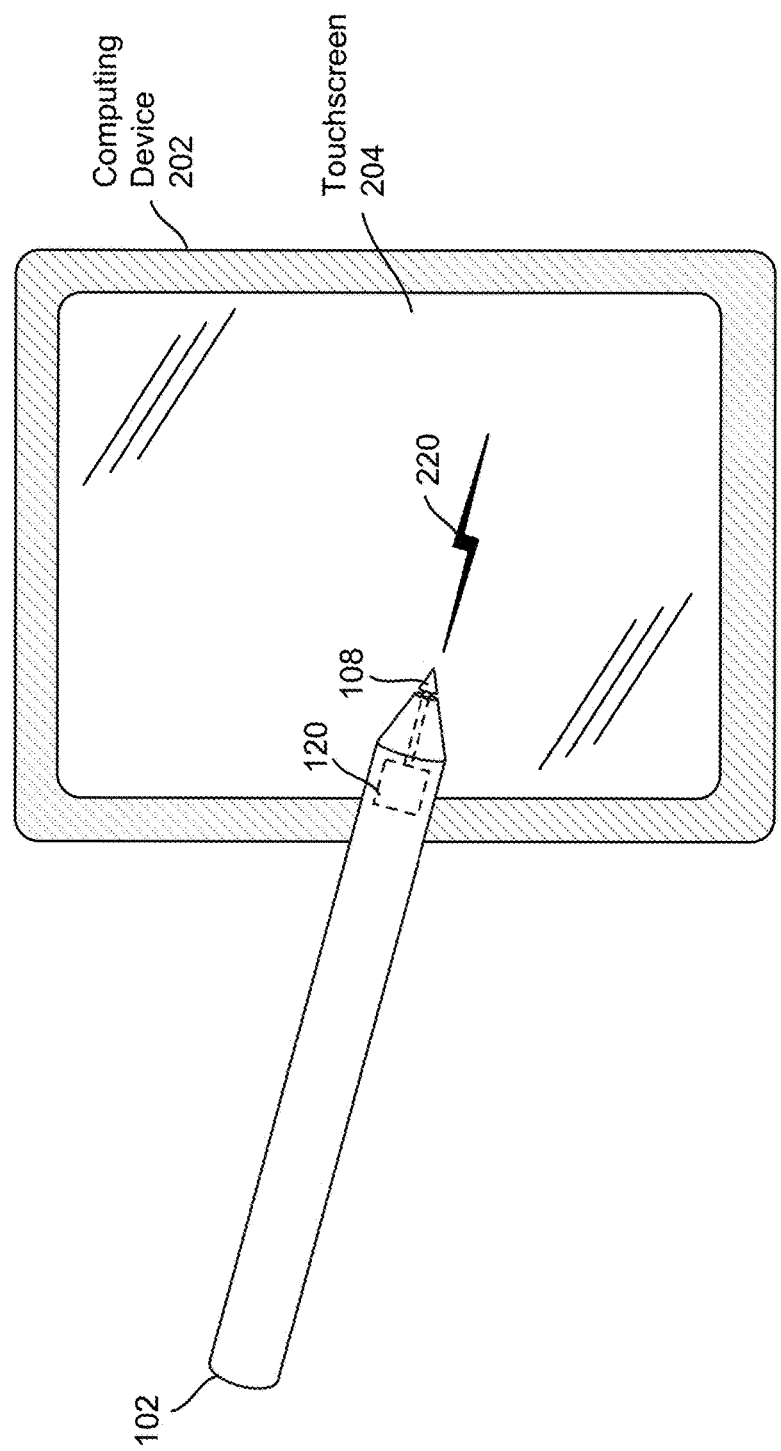
FIG. 2 illustrates a stylus interacting with a computing device according to embodiments of the present disclosure.

The tip 108 shown in FIG. 1 includes a variety of parts. The tip core 110 includes a center portion of the tip and may be made of a conductive metal material, or may include an electrical connector, so as to conduct electronic signals from the communications module 120 out through the tip to the touchscreen of a computing device, as shown in FIG. 2. As shown in FIG. 2 the tip is capable of exchanging electronic messages 220 with the touchscreen 204 of the computing device 202. Such messages may be exchanged, for example, through a capacitive interface where a charge can be detected between the tip 108 an the touchscreen 204. The messages may include, for example, a pressure detected by the stylus 108, a location of the stylus 108 on the touchscreen 204 (such as X-Y coordinates), or other information.

Returning to FIG. 1, the tip core 110 may be connected to the communications module 120 through a tip shaft 106 which may include an electrical connector or may itself be electronically conductive. The tip core 110 may be covered with a tip coating 114 that covers the tip core 110. As shown in FIG. 1, portions of the tip core, including the tip cone 112, extend outward from the barrel 104 of the stylus 102. The tip cone 112, as well as other portions of the tip core 110 within the barrel 104, are covered by the tip coating 114. Thus the tip coating 114 is actually what contacts the touchscreen 204 when the stylus 102 is being used with the computing device 202.

The tip 108 is one example of a stylus tip designed according to the present disclosure. Various configurations of the stylus tip 108 are possible. The stylus tip 108 may be configured to address the concerns addressed above. For example, the shape of the tip cone 112 is configured so that electrical communications are generally stable without large fluctuations due to stylus position. Further, the coating material may be designed to allow a certain level of friction between the stylus and device to create a natural feel of operation to a user. The tip coating material also may be designed to avoid scratching of the touchscreen coating(s) such as oleophobic (anti-oil)/anti-fingerprint coating, anti-glare coating, abrasion resistance coating or the like. The coating may be sufficiently thin to reduce disruption to electrical signals passing through the coating but also may be sufficiently thick to provide sufficient durability of operation. For example, coating thickness may be selected to allow thousands of stylus-device interactions before the coating wears down to be so thin as to risk mechanical failure that may allow portions of the tip core 110 to contact (and potentially damage) the touchscreen. The shape of the tip cone 112 and tip coating 114 are also configured to avoid other concerns such as other types of mechanical damage (for example damage to the stylus from dropping), chemical damage (for example undesired materials contacting the tip coating), etc., Further, the tip 108 may be removable and replaceable, such that if the tip coating 114 does wear down, or the tip 108 otherwise malfunctions, a new tip may be placed into the stylus 102.

Further details of the tip design and configuration are described below. While the description below discusses certain design considerations and selections individually, it should be understood that one design choice may impact another (for example a different tip coating material may change the thickness of the tip coating). Thus the teachings below should be considered together as meeting the aforementioned design challenges.

Figure 3A:
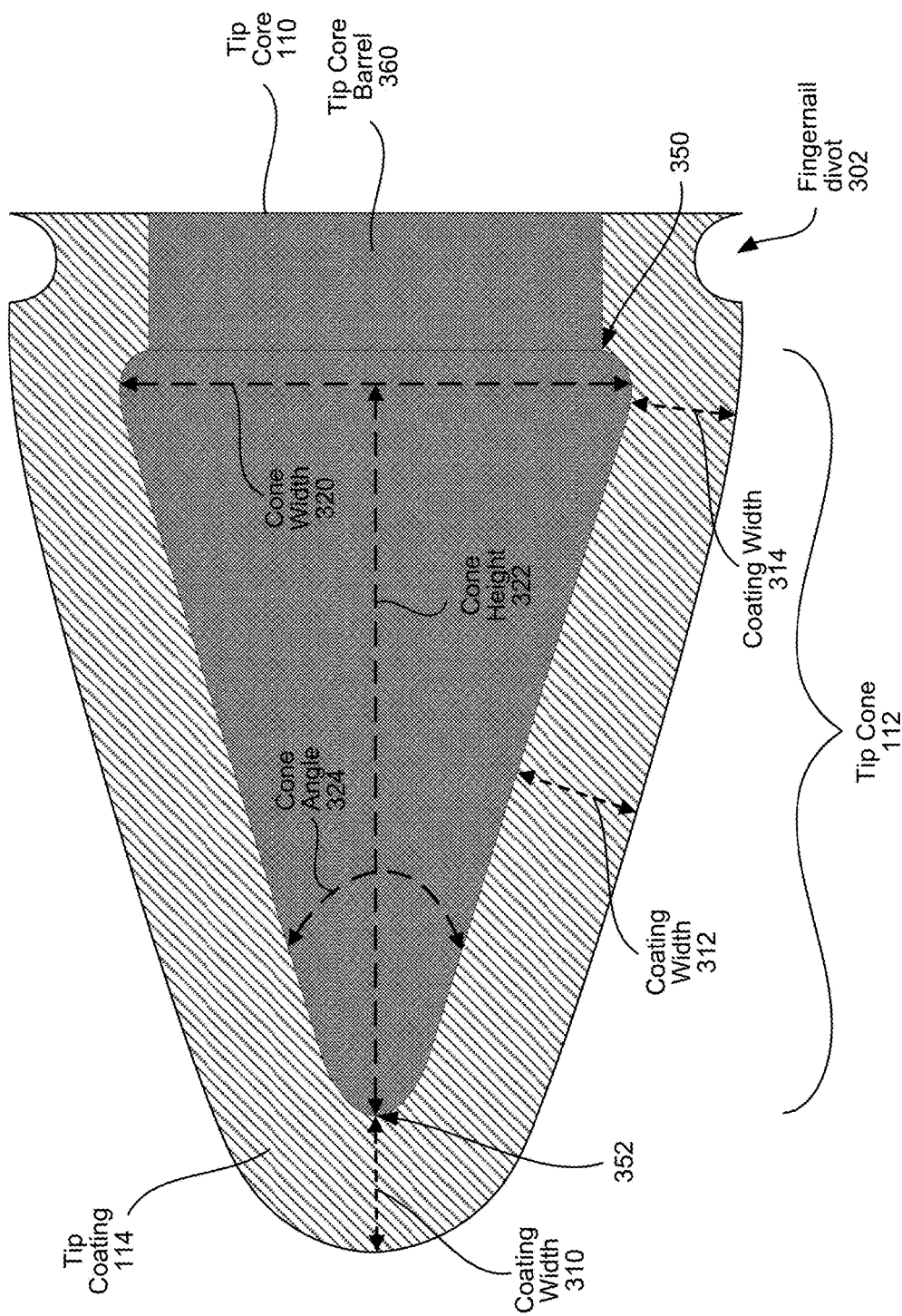
FIG. 3A illustrates various components of a stylus tip according to embodiments of the present disclosure.

FIG. 3A shows an enlargement of the general area of the stylus tip surrounding the tip cone 112. As shown in FIG. 3A, the area of the tip cone 112 is generally defined as the portion of the tip core 110 from the nose 352 of the tip core 110 to the end of the tip cone 112 that connects with the main barrel of the tip core 110. The precise boundaries of the tip cone 112 may vary however, for example the tip cone may be considered to be from the nose 352 to some other point on the cone. For example, the tip cone may be between the nose 352 to the widest point of the cone, illustrated by cone width 320.

The tip core 110 may be made of a variety of materials. In one example, the tip core may be made of stainless steel due to a combination of conductive and strength properties of stainless steel. Other materials may be selected. The other materials may include conductive materials (e.g., metals such as silver, copper, aluminium, etc.) or non-conductive materials (such as a plastic composition) with conductive components (such as an internal connector, conductive coating, etc.) added to enable the communications between the stylus tip 108 and the touchscreen 204. The tip core should thus be configured (either through its material or through additional components) to provide sufficient electrical communication ability to allow capacitive communication between the tip 108 and the touchscreen 204. The tip core material should also be selected to provide sufficient stiffness to provide desired feel of mechanical operation between the stylus and the touchscreen. The tip core material should also be selected to allow for sufficient durability of the stylus and stylus tip over time.

The shape and configuration of the tip cone 112 affects a number of performance factors. First, the configuration of the tip cone 112 impacts a number of mechanical considerations. the durability of the stylus from the perspective of interactions with the touchscreen. Too fine of a point of the tip cone 112 may be more likely to damage the touchscreen or may result in too little friction between the tip and the touchscreen, resulting in an undesirable feel. Too broad of a point may result in too much friction between the tip and the touchscreen, also resulting in an undesirable feel. Too broad of a point may make it difficult to perform precise strokes with the stylus on the touchscreen. Finally, the shape of the tip cone 112 may also impact durability of the stylus and stylus tip, both with regard to repeated interactions with the touchscreen and with regard to factors such as resistance to drops or other mechanical failures.

The configuration of the tip cone 112 also impacts a number of electrical considerations. First, the shape of the tip cone 112 may also impact the performance of certain components, such as a pressure sensor that measures the pressure exerted when the stylus tip contacts the touchscreen. The configuration of the tip cone 112 also impacts the precision of electrical communications between the tip and the touchscreen. For example the shape of the electrical conductor on the tip will govern the performance of capacitive communications between the tip and the touchscreen. If the conductor on the tip is too large, or the shape constructed in a particular way, the performance quality of communications between the stylus tip and the touchscreen may vary greatly depending on the angle of the stylus relative to the touchscreen. An example of this is shown in FIGS. 4A and 4B.

As shown in FIG. 4A, in one operational scenario a stylus tip 108 may be positioned relative to a device 202 such that the stylus 102 is at a small angle relative to the touchscreen 204. As shown in FIG. 4B, in a different operational scenario a stylus tip 108 may be positioned relative to a device 202 such that the stylus 102 is at a large, almost 90 degree angle relative to the touchscreen 204. If the tip 108 is not configured properly, signal strength and other communication performance metrics between the tip 108 and the touchscreen 204 may vary greatly depending on the angle of the stylus resulting in different performance between the scenario of FIG. 4A and FIG. 4B. Such performance variations are undesirable. It is thus preferred for the tip 108 to be configured to avoid variations based on the stylus angle. The proper configuration will incorporate both a proper shape and size of the tip cone 112 as well as the proper size and shape of the tip coating 114 on the tip cone 112. That is, the thickness of the tip coating 114 should avoid large fluctuations around the tip cone 112 and should preferably have a fairly uniform thickness. This uniform thickness will help prevent large communication performance fluctuations based on the angle of the stylus.

Further, the tip 108 should be configured to avoid large signal variations between adjacent electrodes or other sensors on the touchscreen 204 during operation of the stylus. An example of this is shown in FIG. 5, which is not to scale. As shown in FIG. 5, the touchscreen 204 of the computing device 202 may include a number of sensors 502 disposed near the surface of the touchscreen 204 to detect the position of the tip 108 and to communicate using electric signals 220 passed between the touchscreen sensors 502 and the conductive tip core 110. As the trip 108 travels across the surface of the touchscreen 204, the geometry and configuration of the tip 108 should be such that an individual touchscreen sensor does not experience steep fluctuations of detected electrical signal as the tip 108 approaches, travels above, and then travels away from the individual touchscreen sensor. Such fluctuations are a function not only of the touchscreen sensors themselves, but also are a function of the tip conductors' arrangement, and thus the configuration of the tip 108.

The geometry of the tip cone 112 may be configured to account for these various considerations. Referring again to FIG. 3A, the geometry of the tip cone 112 may be described by several measurements. One measurement is the cone width 320, which may be measured at the widest portion of the tip cone 112. Another measurement is the cone angle 324 between opposite walls of the cone. Another measurement is the cone height 322 which may be measured from the vertex at the cone nose 352 to the widest point of the cone. The cone height 322 may also be measured to another point near the cone base that is not necessarily the widest point, for example from the cone nose 352 to the point 350 where the tip cone 112 meets the tip core barrel 360. Other measurements such as base radius, surface area, roundness of the cone nose, etc. may also be used to configure the shape of the tip cone 112. As can be appreciated, adjusting these measurements may result in differently shaped cones. A tip cone with a fixed cone height but an increasing cone width will result in a tip cone of increasing breadth and an increasing cone angle. Too large of a cone angle will affect electrical communications with the touchscreen, such as concerns of signal stability discussed above in reference to FIG. 5. Different embodiments of the stylus tip will result in different measurements of the tip cone. In one embodiment the cone width 320 at the cone's widest point is between about 1.75 and about 2.0 millimeters and the cone height 322 between the cone nose 352 and the widest point of the cone base is between about 2.25 and about 2.75 millimeters. In one specific embodiment the cone width 320 at the cone's widest point is about 1.8 millimeters and the cone height 322 between the cone nose 352 and the widest point of the cone base is about 2.5 millimeters. Thus the cone width 320 may be about 1.3 times as large as the cone width. Different measurements are also possible.

Figure 3B:
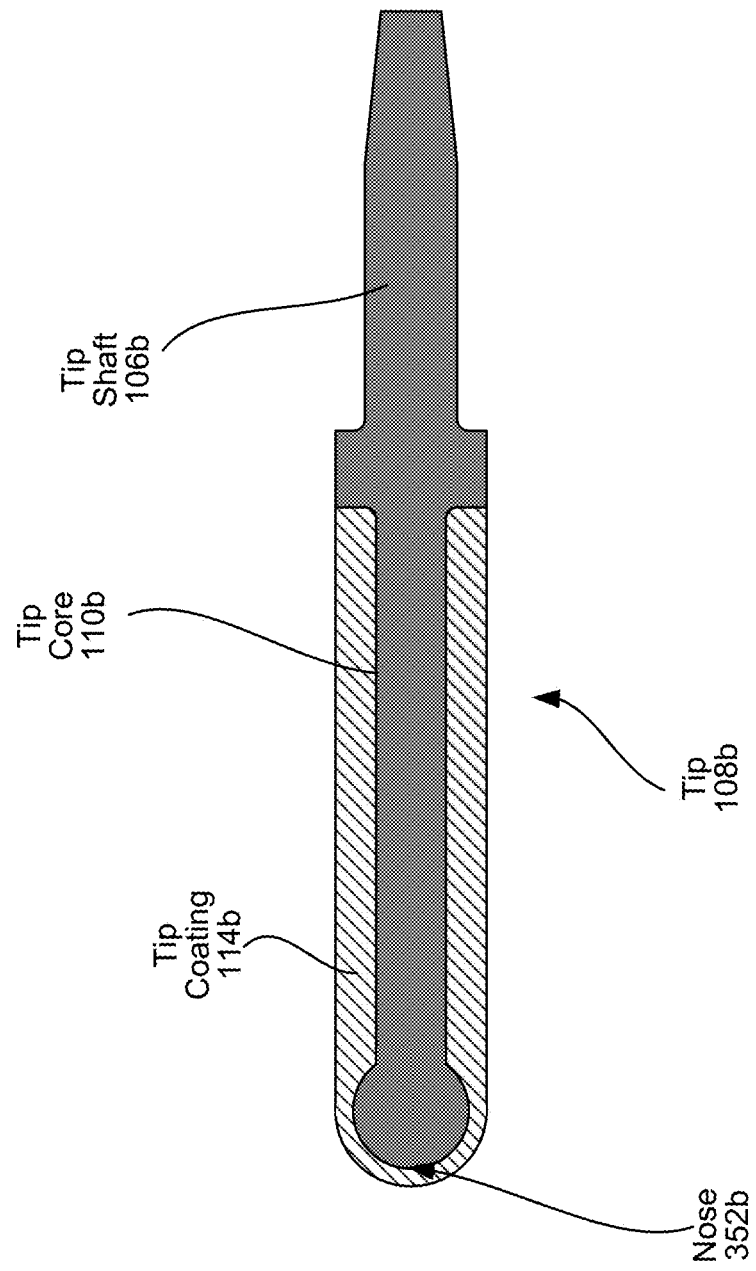
FIG. 3B illustrates a stylus tip according to embodiments of the present disclosure.
Figure 3C:
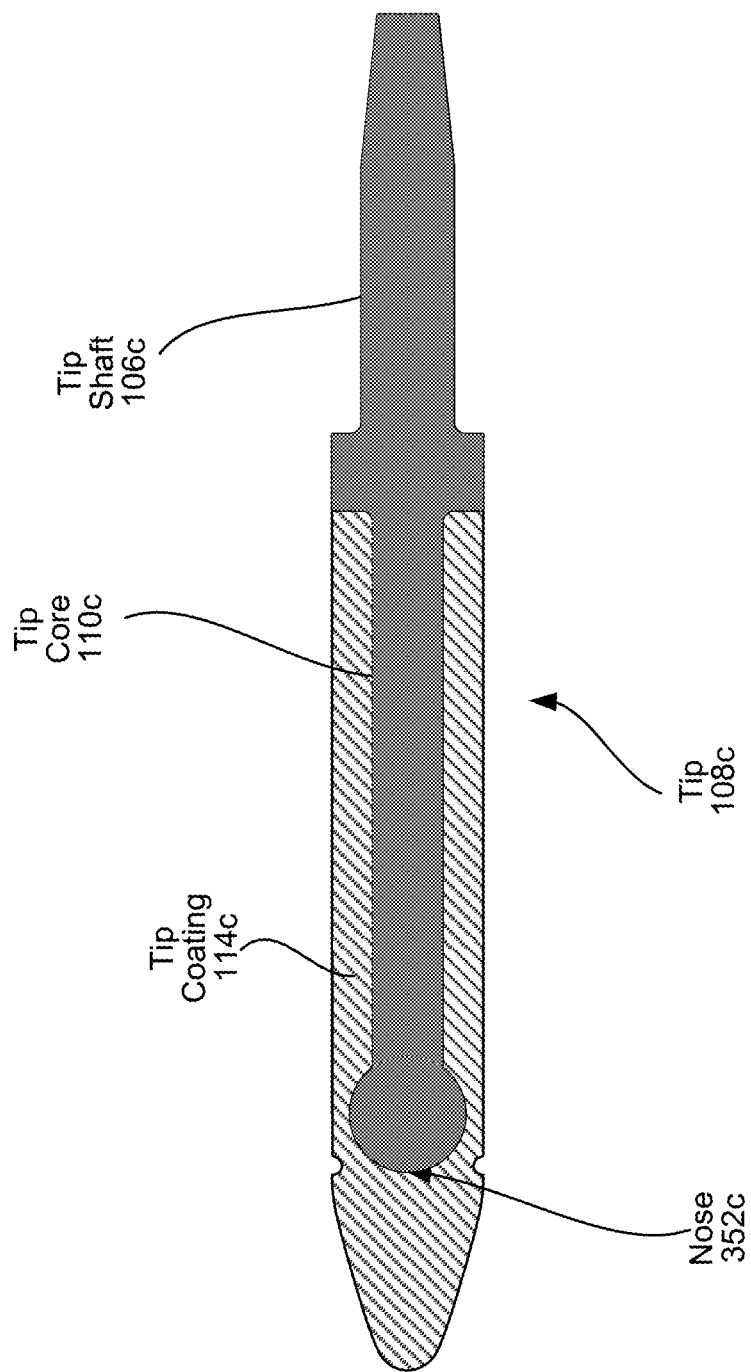
FIG. 3C illustrates a stylus tip according to embodiments of the present disclosure.

In addition to a cone shape, where a radius of the nose of the tip varies and the tip has a wide base, but narrow nose, such as that shown in FIG. 3A, other shapes are possible. For example, a stylus tip 108b may be configured as shown in FIG. 3B, where the nose end 352b of the tip 108b is a spherical shape. As shown in FIG. 3B, the nose 352b has a constant radius (corresponding to a spherical shape) as opposed to a varying radius (corresponding to a cone or tapered shape). The tip coating 114b of tip 108b may be rounded to correspond to the shape of the nose 352b or may be configured differently. For example, as shown in FIG. 3C, for tip 108c the tip coating 114c may be molded to provide a different shape of the end of the tip 108c. The different shape of tip 108c may be more preferred by users as it more closely resembles a traditional pen/stylus. In the case of tip 108c, the tip coating 114c may be made of a different material toward nose 352c than around tip core 110c to provide for a different writing feel. As can be appreciated, different shapes and material compositions are possible.

The thickness of the tip coating 114 will also impact the various considerations discussed. The coating 114 has multiple purposes, including providing the right amount of friction between the stylus and the touchscreen, protecting the touchscreen from the tip cone 112 and tip core 110, protecting the tip cone 112 and tip core 110, etc. The coating 114 should be thick enough to provide the desired mechanical protection and durability in case of unexpected mechanical stress (e.g., dropping the stylus on the tip), but should also be thin enough so as not to interfere with electrical communications between the stylus 102 and touchscreen 204. The tip coating 114 should also be thick enough that normal usage of stylus tip 108 will not erode the tip coating 114 too quickly, resulting in exposure of the tip cone 112 and potential damage to the touchscreen 204.

The thickness of the tip coating 114 obviously depends on the material of the tip coating 114, discussed below. The thickness of the tip coating 114 also depends on the manufacturing process, as the coating should be sufficiently thick to allow for good manufacturing yields. The process of applying the tip coating 114 to the tip cone 112, called over molding, may involve the use of vented steel, where the tip material is applied using a porous steel material allowing air to escape when applying the tip coating material in a mold cavity. The use of vented steel allows air to escape during the molding process, resulting in a tip coating 114 that is generally free from undesired air holes. Present manufacturing techniques may allow for the tip coating 114 to approach widths down to approximately 0.25 millimeters, however such a thinness may result in lower manufacturing yields and/or unsatisfactory mechanical performance, so an increased thickness may be desired.

In one embodiment, the above considerations result in a tip coating 114 that varies between about 0.3 millimeters to about 0.6 millimeters in thickness around the tip cone. In one example, the thickness of the tip coating 114 varies from about 0.4 millimeters to about 0.5 millimeters, with the thickest portion of the tip coating being near the nose of the tip cone (310), the thinnest portion of the tip coating being near the base of the tip cone (314), and other portions of the coating (312) having an intermediate thickness. In another example, the thickness of the coating near the nose of the tip cone (310) is between about 0.3-0.5 millimeters, the thickness of the coating near the base of the tip cone (314) is between about 0.4-0.6 millimeters and other portions of the coating (312) have an intermediate thickness.

As can be seen in FIG. 3A, the tip coating 114 may be applied to the tip core 110 so as to form an indentation, which may be referred to as the fingernail divot 302. The divot 302 may be an indented ring formed in the tip coating 114 near the base of the tip cone 112. The divot allows a user to grip the tip 108 when removing the tip 108 from the stylus barrel 104, for example when replacing the tip. As shown in FIG. 1, the tip 108 may be positioned within the barrel 104 so that a user can grip and remove the tip 108 using the fingernail divot 302. Existing stylus devices may require a separate tool to remove a tip, which may be lost or damaged. The fingernail divot 302 allows the user to remove the tip from the stylus easily.

The material of the tip coating 114 may depend on all the design considerations and variables discussed above. The tip coating 114 may be conductive, which may improve signal strength of electrical communications between the tip 108 and the touchscreen 204, or may be nonconductive, which may improve mechanical performance and the feel of the stylus operation, due to undesired frictional or other characteristics of conductive material. A nonconductive coating may be configured to be thinner than a comparable conductive coating due to electrical constraints. The tip coating should be configured to allow good electrical communication between the tip 108 and the touchscreen 204, provide good mechanical protection and durability, and allow for the proper frictional engagement between the tip 108 and the touchscreen 204 when being operated by a user.

One example of a coating material is a polyoxymethylene (POM), also known as acetal, polyacetal and polyformaldehyde. POM is a thermoplastic that allows for good stiffness, low friction and good wear resistance. Other materials such as nylon, PBT, polyurethane, or the like may also be used.

These materials may be mixed with other materials, for example with conductive fillers such as carbon fiber, carbon black, stainless steel fiber, metal coated particulates, etc. to improve the electrical performance of the coating material. While such mixtures may improve the electrical performance, they may also risk damaging a touchscreen coating during operation. Further, coating a stylus tip with the above materials such as POM and PBT may not provide the desired grip between the tip and the touchscreen, resulting in a less desirable user experience that does not sufficiently mimic the pen on paper feel while operating the stylus.

Other materials, such as thermoplastic elastomers (TPEs) or other elastomeric materials may provide the desired friction between the tip and touchscreen, and may provide an improved operational feel, but they may fail the durability and mechanical requirements. Still other tip materials, such as pultruded glass fiber coated with PBT or POM may be used, but do not work well when the tip coating thickness should be reduced to allow for desired electrical performance. The glass fiber may also result in undesired abrasion to a touchscreen coating.

As can be appreciated, configuring a tip coating to meet the above design constraints is a non-trivial problem. In certain embodiments, a non-conductive material is selected to satisfy the above constraints. Preferably, the non-conductive material has a high dielectric constant to reduce disruption to the electrical communications between the tip and touchscreen. In one embodiment the tip coating may have a dielectric constant approximately between 3-5. The coating may be have a semi-crystalline structure, which allows the material to be manufactured in a thin coating. The coating material may be a hard, low friction base material that can be mixed with other materials to achieve the desired characteristics.

In one example, a POM or nylon base material may be used mixed with a polytetrafluoroethylene (PTFE) micropowder. This will result in a consistent surface coating with desired low-wear characteristics. This mixture, however, may not provide the best feel as it may be too low friction, resulting in an insufficient grip between the tip and touchscreen both when touching and removing the tip and when sliding the tip across the touchscreen in a writing motion. Further, such a tip coating may provide an undesired acoustic response during operation. The acoustic response may be akin to a "click" as heard when the stylus is touched to the touchscreen. The "click" may be a result of the hardness of the coating. Such an acoustic response is generally undesired.

The improved feel and acoustic response may be obtained using a slightly softer material with a higher coefficient of friction. Though the material should not be so soft as to result in significant compression of the coating during stylus operation. Further, if possible it is desired to match the speed of the user writing with the tablet to the speed of the rendering of strokes on the touchscreen. These speeds of course depend on a number of factors such as the processor speed of the computing device, the speed of the user's writing, etc. However, to the extent possible, the material may be configured with a coefficient of friction based on the processing power of an expected computing device that will be used with the stylus. In this manner the speed of writing may at least nominally be matched to the latency of stroke display by the device.

To provide the desired overall response, mixture materials may be selected and added to a base material to achieve the slightly softer, slightly higher frictional coefficients desired while still maintaining the desired stiffness, durability, and dielectric performance. In one aspect, a composite tip coating material is configured from TPE with additives of PTFE and aramid fibers. Aramid fibers are strong synthetic fibers that are used in various applications including body armor. Such a material may maintain the coefficient of friction of the base TPE with improved wear from addition of the PTFE and aramid fibers. In one example the coating material is between about 5-30% by weight of aramid fibers, between about 10-30% by weight of PTFE, and the remainder TPE. In another example, the coating material is between about 1-20% by weight of aramid fibers, between about 5-25% by weight of PTFE, and the remainder TPE. In another example the coating material is about 10% by weight of aramid fibers, about 15% by weight of PTFE, and the remainder TPE. As a substitute for the aramid fibers, polyolefin fibers may also be used.

Figure 6:
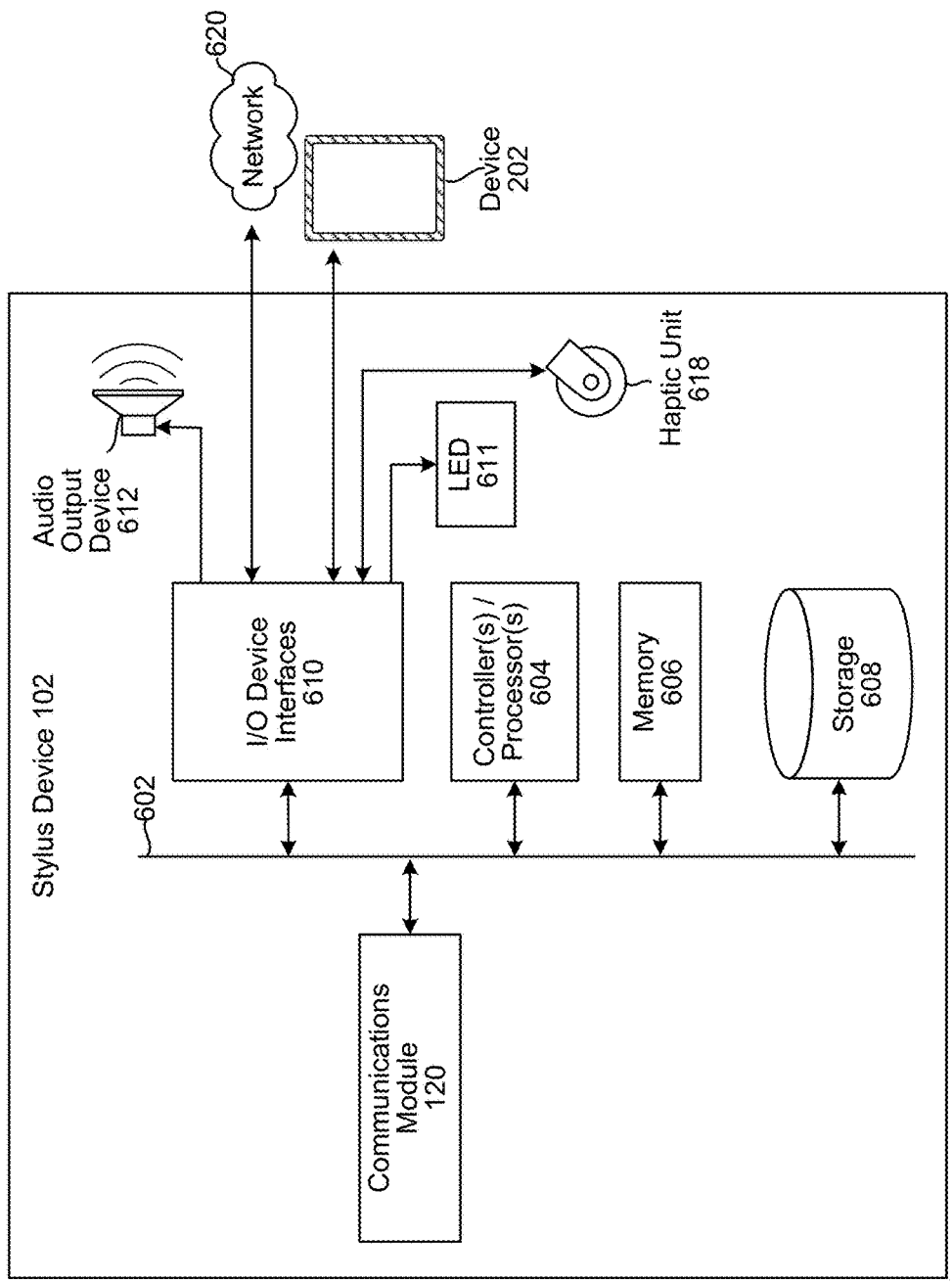
FIG. 6 is a block diagram conceptually illustrating example components of a stylus device according to embodiments of the present disclosure.

FIG. 6 is a block diagram conceptually illustrating example components of the stylus device 102. In operation, the stylus device 102 may include computer-readable and computer-executable instructions that reside on the stylus device 102 to perform various operations, for example communicating between the stylus 102 and the touchscreen device 202.

As illustrated in FIG. 6, the stylus device 102 may include an address/data bus 602 for conveying data among components of the stylus device 102. Each component within the stylus device 102 may also be directly connected to other components in addition to (or instead of) being connected to other components across the bus 602.

The stylus device 102 may include one or more microcontrollers/controllers/processors 604 that may each include a central processing unit (CPU) for processing data and computer-readable instructions, and a memory 606 for storing data and instructions. The memory 606 may include volatile random access memory (RAM), non-volatile read only memory (ROM), non-volatile magnetoresistive (MRAM) and/or other types of memory. The stylus device 102 may also include a data storage component 608, for storing data and microcontrollers/controller/processor-executable instructions (e.g., instructions to perform communications using the communications module 120). The data storage component 608 may include one or more non-volatile storage types such as magnetic storage, optical storage, solid-state storage, etc. The stylus device 102 may also be connected to removable or external non-volatile memory and/or storage (such as a removable memory card, memory key drive, networked storage, etc.) through input/output device interfaces 610.

Instructions for operating the stylus device 102 and its various components may be executed by the microcontroller(s)/controller(s)/processor(s) 604, using the memory 606 as temporary "working" storage at runtime. The instructions may be stored in a non-transitory manner in non-volatile memory 606, storage 608, or an external device. Alternatively, some or all of the executable instructions may be embedded in hardware or firmware in addition to or instead of software.

The stylus device 102 includes input/output device interfaces 610. A variety of components may be connected through the input/output device interfaces 610, such as an audio output device for producing sound, such as speaker(s) 612; a light emitting diode (LED) 611; a haptic unit 618; and/or other components, such as, one or more audio capture device(s), such as a microphone or an array of microphones, buttons, and/or other components (not illustrated). The speaker(s) 612, the LED 611, the haptic unit 618 and other components may be integrated into the stylus device 102 or may be separate.

The input/output device interfaces 606 may also include an antenna (not shown) to connect one or more networks 620, such as a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The computing device 202 and the stylus device 102 may communicate using electromagnetic communications (for example, electric fields generated by each device to transmit data on a carrier frequency), and/or haptic communications.

The stylus device 102 may include a communication module 120 that coordinates electromagnetic communications between the stylus 102 and device 202. The communication module 120 may include circuitry and components such as an instrumentation amplifier and a low leakage single-pole single-throw (SPST) switch, one or more resisters, one or more noise filtering components, such as a band pass filter and an automatic gain controller, and/or other components to provide a communication interface between a touch controller of a computing device 202 and the stylus device 102. Communications between the active stylus device 102 and the computing device 202 may be through capacitive communications between the stylus 102 and the device 202, for example through electronic signals exchanged between components of the touchscreen 204 and the tip 108.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied to a stylus configured for operations with a number of different devices and computer systems, including, for example, general-purpose computing systems, televisions, stereos, radios, telephone computing systems, laptop computers, cellular phones, personal digital assistants (PDAs), tablet computers, wearable computing devices (watches, glasses, etc.), other mobile devices, etc. that can operate with a touchscreen.

As used in this disclosure, the term "a" or "one" may include one or more items unless specifically stated otherwise. Further, the phrase "based on" is intended to mean "based at least in part on" unless specifically stated otherwise.

What is claimed is:

1. A stylus comprising:
   a barrel;
   a removable tip coupled to the barrel, the removable tip comprising:
   a stainless steel core comprising a cone portion and a shaft portion, wherein:
   the shaft portion is configured to be inserted into the barrel, the cone portion is configured to protrude outward from the barrel when the shaft is inserted into the barrel, and
   a cone height between a nose of the cone portion and a base of the cone portion is about 1.3 times larger than a cone width at the base of the cone portion;
   a coating material surrounding an exterior of at least the cone portion, wherein:
   the coating material comprises about 10% by weight of aramid fibers, about 15% by weight of polytetrafluoroethylene, and about 75% by weight of thermoplastic elastomer, and
   a first thickness of the coating material around the base of the cone portion is thinner than a second thickness of the coating material proximate to the nose of the cone portion; and
   a processor communicatively connected to the cone portion through the shaft portion, the processor configured to output an electrical signal from the cone portion.

2. The stylus of claim 1, wherein the coating material comprises an indentation around the stainless steel core, wherein the indentation is:
   located proximate to the cone portion,
   configured to be outside the barrel when the shaft portion is inserted into the barrel, and
   configured to receive a fingernail during removal of the removable tip from the barrel.

3. A stylus tip of a stylus comprising:
   a core comprising a cone portion and a shaft portion, wherein:
   the shaft portion is configured to be inserted into a stylus barrel,
   the cone portion is configured to protrude outward from the stylus barrel when the shaft is inserted into the stylus barrel, and
   the cone portion is configured to be electrically connected to a processor of the stylus barrel; and
   a coating material surrounding an exterior of at least the cone portion, the coating material having a thickness between about 0.3 millimeters and 0.6 millimeters.

4. The stylus tip of claim 3, wherein the cone portion comprises:
   a cone height between a nose of the cone portion and a base of the cone portion between about 2.25-2.75 millimeters; and
   a cone width at the base between about 1.75-2.0 millimeters.

5. The stylus tip of claim 3, wherein the coating material comprises an indentation located proximate to the cone portion.

6. The stylus tip of claim 3, wherein the core comprises a conductive material comprising stainless steel.

7. The stylus tip of claim 3, wherein the coating material comprises aramid fibers, polytetrafluoroethylene, and thermoplastic elastomer.

8. The stylus tip of claim 7, wherein the coating material comprises between about 1-20% by weight of the aramid fibers, between about 5-25% by weight of the polytetrafluoroethylene, and between about 30-85% weight of the thermoplastic elastomer.

9. The stylus tip of claim 8, wherein the coating material comprises about 10% by weight of the aramid fibers, about 15% by weight of the polytetrafluoroethylene, and about 75% by weight of the thermoplastic elastomer.

10. The stylus tip of claim 3, wherein the coating material forms an indentation, and wherein:

the indentation is configured to be outside the stylus barrel when the shaft portion is inserted into the stylus barrel; and the stylus tip is removable from the stylus barrel by inserting a fingernail in the indentation.

11. The stylus tip of claim 3, wherein the coating material comprises:
a first thickness around a base of the cone portion between about 0.3-0.5 millimeters; and
a second thickness of proximate to a nose of the cone portion between about 0.4-0.6 millimeters.

12. A stylus tip of a stylus, comprising:
a core comprising a cone portion and a shaft portion, wherein:
the shaft portion is configured to be inserted into a stylus barrel, the cone portion is configured to protrude outward from the stylus when the shaft is inserted into the stylus, and
the cone portion is configured to be electrically connected to a processor of the stylus; and
a coating material surrounding an exterior of at least the cone portion, wherein a first thickness of the coating material around a base of the cone portion is thinner than a second thickness of the coating material proximate to a nose of the cone portion, the coating material comprising about 10% by weight of aramid fibers, about 15% by weight of polytetrafluoroethylene, and about 75% by weight of thermoplastic elastomer.

13. The stylus tip of claim 12, wherein:
a cone height between the nose and the base is between about 2.25-2.75 millimeters; and
a cone width at the base is between about 1.75-2.0 millimeters.

14. The stylus tip of claim 12, wherein a cone height between the nose and the base is about 1.3 times larger than a cone width at the base.

15. The stylus tip of claim 12, wherein the coating material comprising aramid fibers, polytetrafluoroethylene, and thermoplastic elastomer.

16. The stylus tip of claim 15, wherein the coating material comprises between about 5-30% by weight of the aramid fibers, between about 10-30% by weight of the polytetrafluoroethylene, and between about 30-85% weight of the thermoplastic elastomer.

17. The stylus tip of claim 12, wherein the coating material has a thickness between about 0.3 millimeters and 0.6 millimeters.

18. The stylus tip of claim 17, wherein:
the first thickness is between about 0.3-0.5 millimeters; and
the second thickness is between about 0.4-0.6 millimeters.

19. The stylus tip of claim 12, wherein the coating material comprises an indentation located proximate to the cone portion.

20. The stylus tip of claim 12, wherein the core comprises a conductive material comprising at least one of stainless steel, copper, silver, or aluminium.

* * * * *